United States Patent [19]

Dimitrov et al.

[11] Patent Number: 4,888,538
[45] Date of Patent: Dec. 19, 1989

[54] SYSTEM FOR REMOTE TRANSMISSION OF ANGULAR POSITION AND FORCE BETWEEN MASTER AND SLAVE SHAFTS

[75] Inventors: Dimith T. Dimitrov, Stara Zagora, Bulgaria; Ljudimila I. Matjukhina, Minsk, U.S.S.R.; Alexandr S. Mikhalev, Minsk, U.S.S.R.; Igor M. Chushenkov, Minsk, U.S.S.R.

[73] Assignee: Belorussky Gosudarstvenny Universitet imeni V.I. Lenina, Minsk, U.S.S.R.

[21] Appl. No.: 174,997
[22] PCT Filed: May 14, 1987
[86] PCT No.: PCT/SU87/00058
§ 371 Date: Jan. 13, 1988
§ 102(e) Date: Jan. 13, 1988
[87] PCT Pub. No.: WO87/07419
PCT Pub. Date: Dec. 3, 1987

[30] Foreign Application Priority Data

May 19, 1986 [SU] U.S.S.R. ............... 4087425

[51] Int. Cl.⁴ ............. G05B 19/42; H02K 29/06
[52] U.S. Cl. ............. 318/675; 318/568.1; 318/574; 318/575; 364/513; 307/87; 901/9; 901/15
[58] Field of Search ............ 318/565, 563, 566, 567, 318/568 R, 568 I, 568 L, 569-577, 434; 364/513; 901/15-28, 32, 9; 414/2, 4, 6, 8, 730, 5; 307/52-87

[56] References Cited

U.S. PATENT DOCUMENTS

| 4,068,156 | 1/1978 | Johnson et al. .............. 318/575 |
| 4,087,698 | 5/1978 | Myers ........................... 307/84 |
| 4,221,997 | 9/1980 | Flemming ..................... 318/574 |
| 4,275,311 | 6/1981 | Agazzone et al. ........... 307/86 X |
| 4,302,138 | 11/1981 | Zarudiansky . | |
| 4,442,387 | 4/1984 | Lindbom ...................... 901/9 X |
| 4,527,071 | 7/1985 | Ausiello ....................... 307/81 X |
| 4,550,383 | 10/1985 | Sugimoto ..................... 364/513 |
| 4,631,689 | 12/1986 | Arimura et al. ............. 318/568 X |
| 4,661,032 | 4/1987 | Arai .............................. 364/513 X |
| 4,661,762 | 4/1987 | Baker ............................ 307/87 X |
| 4,718,078 | 1/1988 | Bleidorn et al. ............. 318/563 X |

FOREIGN PATENT DOCUMENTS

| 1506380 | 2/1973 | Fed. Rep. of Germany . |
| 1616025 | 2/1977 | Fed. Rep. of Germany . |
| 2420177 | 10/1979 | France . |
| 1176425 | 2/1978 | U.S.S.R. . |
| 634428 | 11/1978 | U.S.S.R. . |
| 1257690 | 3/1984 | U.S.S.R. . |

OTHER PUBLICATIONS

"Proektirovanie . . . deistvia" (without translation).

Primary Examiner—William M. Shoop, Jr.
Assistant Examiner—Paul Ip
Attorney, Agent, or Firm—Lilling & Greenspan

[57] ABSTRACT

Disclosure is made of a system for remote transmission of the angular position and force between the master and slave shafts, which includes master and slave synchronous machines (1,2) whose shaft position sensors (9,10) are electrically connected to inputs (11,12) of a unit (13) for assigning orientation of stator magnetic fields of the synchronous master and slave machines and to information inputs (15,14) of a device (16) for assigning the amplitude of stator magnetic fields of master and slave synchronous machines, having its output electrically connected to a control input (21) of a unit (22) producing current in the windings of the synchronous machines, having its setting input (23) connected to the output of the unit (13) for orientation assigning. The outputs of the producing current unit (22) are connected to electrically linked respective windings of the synchronous machines (1,2). The amplitude assigning device (161) comprises a unit (17) for determination of the assigned mismatch between the shafts of the synchronous machines, having a setting input (20) to which is applied a signal corresponding to the scaling factor of the force transmitted to the shaft (3) of the synchronous machine (1), and a comparison unit (18) connected in series to said unit (17).

15 Claims, 8 Drawing Sheets

SYSTEM FOR REMOTE TRANSMISSION OF ANGULAR POSITION AND FORCE BETWEEN MASTER AND SLAVE SHAFTS

BACKGROUND OF THE INVENTION

1. Field of the Invention

This invention relates to electric motors and, in particular, to systems for remote transmission of angular position and force between master and slave shafts.

2. Description of the Prior Art

Master-slave manipulators known at present are basically used in extreme conditions dangerous for the operator. It is therefore quite natural that very stringent requirements are set to systems for remote transmission of the angular position and effort from an input shaft to an output shaft which are kinematically connected to respective links of the master-slave manipulator to control the position of its actuators. These requirements include high reliability, durability, and good response to the actions of an operator possessing substantial adaptive capabilities. Specifically, such systems permit static errors in angular position transmission have a comparatively low accuracy in force transmission to the input shaft. These parameters should be within the range of human capabilities. But it should be borne in mind that the load applied to the output shaft may vary over an extremely broad range from practically imperceptible loads to those clearly beyond his physical capabilities. To make the operator-manipulator system serviceable with the load on the output shaft varying over a wide range, the scaling factor of the force transmitted to the input shaft should be variable without interruption of the system operation.

Known in the art is a system for remote transmission of the angular position and force between master and slave shafts, which comprises DC commutator motors kinematically connected with input and output shafts, whose windings are coupled to outputs of amplifiers, motor shaft position sensors connected to inputs of a first comparison element, and torque transducers, one said torque transducer being connected to the input of the second comparison element, while the second torque transducer is connected to the other input of the second comparison element via a converter for proportional signal control, which features a settling input. The output of the second comparison element is connected to the input of the amplifier of the master motor, while the output of the first comparison element is connected to the input of the amplifier of the actuator motor (I. N, Egorov et al., "Proektirovanie slediaschikh sistem dvustoronnego deistviya", 1980, Mashinostroenie Publ, Moscow, pp. 53–58).

In this system the combination of the first comparison element, position sensors, and the actuator motor with the amplifier ensure remote transmission of the angular position, while the second comparison element, torque transducers, and the master motor with the amplifier ensure transmission of power to the input shaft. The operator may change the gain factor of the converter at the setting input thereof when it is required. The converter gain factor is the multiplier for the signal of the load torque transducer. The comparison element generates a signal equal to the difference between the signal corresponding to the torque produced by the operator and the output signal of the converter. The torque developed by the master motor is, therefore, transmitted to the slave shaft as a portion of the load torque assigned by the operator, which corresponds to the change in the scaling factor of the power transmitted to the input shaft.

But the prior art system is deficient in that it makes use of commutator motors which are not reliable and durable since they contain a brush assembly which wears out very fast, particularly in harsh conditions. Torque transducers add to the system unreliability, making it still more complex and prone to faults.

Some of the above disadvantages are eliminated in a system for remote transmission of the angular position and effort between the input and output shafts, which comprises master and slave synchronous motors kinematically connected to input and output shafts, shaft position sensors whose outputs are connected to inputs of a comparison element having its input connected to a control input of a unit for generating current in windings of the synchronous motors. Respective windings of the synchronous motors are connected to each other and connected to outputs of the current generating unit. The output of the shaft position sensor of the slave synchronous motor is connected to the setting input of the unit for generating current in the windings of the master and slave synchronous motors (SU, A, 1176425).

This system is much more reliable and durable as compared to the one described above due to the use of synchronous motors having no brush-commutator units and capable of withstanding much more severe conditions. The absence of torque transducers also adds to the system reliability. But this system is deficient in that the scale factor of the force transmitted to the master shaft depends on the load and the operator has difficult time estimating the efforts applied to the actuator shaft. Moreover, the operator cannot adjust the scale factor while the system is operating, which is a serious restriction to varying the slave shaft load.

Also known in the art is a system for remote transmission of the angular position and force between master and slave shafts (SU, A, 1257690), which comprises master and slave synchronous motors whose shafts are connected, respectively, to master and slave shafts and provided with position sensors electrically connected to inputs for setting the orientation of magnetic fields of stators of the master and slave synchronous motors and to information inputs of a device for setting the amplitude of the magnetic fields of the stators of the master and slave synchronous motors, the output of the amplitude setting device being electrically connected to a control input of a unit for generating current in the windings of the master and slave synchronous motors, the setting input of said current generating unit being connected to the output of the unit for setting orientation of the magnetic fields of the master and slave synchronous motors, while the inputs thereof are connected to electrically connected respective windings of the master and slave synchronous motors.

In this system, the device for setting the amplitude of the stator magnetic fields is built around a comparison element. The unit for assigning the orientation of the stator magnetic fields comprises an adder whose inputs are inputs of the orientation assigning unit, while the output of the adder is connected to the input of a divide-by-two circuit whose output is the output of the orientation assigning unit.

This system is designed so that the scale factor of forces transmitted to the master shaft remains unchanged during the operational cycle. In this way the range of load variation on the slave shaft is made somewhat wider as compared to the system where the scale factor changes with the load. But the available load variation range on the slave shaft is still not sufficient for this system to be used in master-slave manipulators designed for operation in extreme conditions. In addition, the mismatch of the shafts of the master and actuator motors still depends on the torques produced by the operator and the load, which affects the accuracy of the shaft angular position transmission.

SUMMARY OF THE INVENTION

The object of the invention is to provide a system for remote transmission of the angular position and effort between master and actuator shafts, equipped with a device assigning the amplitude of stator magnetic fields of the master and slave synchronous motors so that it becomes possible to vary the scale factor of the force transmitted to the shaft of the master synchronous motor, while the remote transmission system is operating.

This is achieved in a system for remote transmission of the angular position and effort between master and actuator shafts, comprising master and actuator synchronous motors whose shafts are connected, respectively, with the master and actuator shafts and are equipped with the position sensors electrically connected to inputs of a unit for assigning the orientation of stator magnetic fields of the master and actuator synchronous motors and to information inputs of a device for assigning the amplitude of stator magnetic fields of the master and actuator synchronous motors; an output of the device for assigning the amplitude of stator magnetic fields of the master and actuator synchronous motors is electrically connected to a control input of a unit generating current in windings of the master and actuator synchronous motors, a setting input of said current generating unit being connected to an output of the unit for assigning the orientation of stator magnetic fields of the master and actuator synchronous motors, while the outputs thereof are connected to electrically linked respective windings of the master and actuator synchronous motors. According the invention, the device for assigning the amplitude of stator magnetic fields of the master and actuator synchronous motors is provided with a unit for determination of the assigned mismatch of the shafts of the master and actuator synchronous motors, which features a setting input to which a signal is applied, which corresponds to the scale factor of the effort transmitted to the shaft of the master synchronous motor, and information inputs functioning as information inputs of the device for assigning the amplitude of stator magnetic fields of the master and actuator motors, and which has its output connected to a setting input of the comparison unit whose information inputs are connected to the information inputs of the unit for determination of the assigned mismatch of the shafts of the master and actuator synchronous motors, while the output thereof is the output of the device for assigning the amplitude of stator magnetic fields of the master and actuator synchronous motors.

It is advisable that the system for remote transmission of the angular position and effort between master and actuator shafts should comprise a correction unit having its input connected to the output of the device for assigning the amplitude of stator magnetic fields of the master and actuator synchronous motors and its output connected to the control input of the unit generating current in the windings of the master and actuator motors.

It is useful that the remote transmission system should comprise a switching device having information inputs thereof connected to shaft position sensors of the master and actuator synchronous motors, and a circuit for determination of polarity of the error signal, which has one input thereof connected to the setting input of the unit for determination of the assigned mismatch of the shafts of the master and actuator motors, while the other input thereof receives signals corresponding to the ratio of starting torques of the master and slave synchronous motors and the output is connected to a control input of the switching device whose outputs are connected to inputs of the unit for assigning orientation of stator magnetic fields of the master and slave synchronous motors and to information inputs of the device for assigning the amplitude of stator magnetic fields of the master and actuator synchronous motors.

It is advantageous that in the remote transmission system the unit for assigning orientation of stator magnetic fields of the master and slave synchronous motors should comprise a circuit for determination of polarity of the shaft mismatch signal of the master and slave synchronous motors, whose inputs function as inputs of the unit for assigning orientation of stator magnetic fields of the master and slave synchronous motors, and a multiplier connected in series to the polarity determination circuit and having a setting input to which a signal is applied which corresponds to the angle between the magnetic fields of the rotor and stator of the master or slave synchronous motor, and an adder connected in series to the multiplier and having one input connected to the output of the multiplier, the other input connected to one of the inputs of the circuit for determination of polarity of the mismatch signal of the shafts of the master and slave synchronous motors, and the output as the output of the unit for assigning orientation of stator magnetic fields of the master and slave motors.

It is effective that in the remote transmission system the unit for determination of the assigned mismatch of shafts of the master and slave synchronous motors should comprise a converter of the power scale factor into the angle between the magnetic fields of the rotor and stator of the master or slave synchronous motors, a multiplier having a first input electrically connected with the output of the converter of the power scale factor into the angle between the magnetic fields of the rotor and stator of the master or slave synchronous motors, a circuit for determination of polarity of the shaft mismatch signal of the master and slave synchronous motors, having its output connected to a second input of the multiplier, and an adder having one input connected to the output of the multiplier, the other input connected to one of the inputs of the circuit for determination of polarity of shaft mismatch signal of the master and slave synchronous motors, which are information inputs of the unit for determination of the assigned mismatch of shafts of the master and slave synchronous motors, and having its output functioning as the output of the unit for determination of the assigned mismatch of shafts of the master and slave synchronous motors.

It is also advisable that in the remote transmission system the unit for determination of the assigned mismatch of shafts of the master and slave synchronous motors should additionally comprise an adder having one input connected to the output of the converter of the power scale factor into the angle between the magnetic fields of the rotor and stator of the master and slave synchronous motors, while a signal corresponding to the 90° angle of rotation of the magnetic stator field of the master or slave synchronous motor is applied to the other input thereof, and the output thereof is connected to the first multiplier.

It is reasonable that in the remote transmission system the correction unit should comprise an integrator, a signal modulus determining circuit whose input is connected to the output of the integrator, a multiplier whose first input is connected to the output of the signal modulus determination circuit, while a second input thereof receives a signal corresponding to the polarity of the mismatch signal of shafts of the master and slave synchronous motors, and a comparison circuit whose first circuit is connected to the output of the multiplier, second input is connected to the input of the integrator, a connection point thereof is the input of the correction unit, and the output of the comparison circuit is the output of the correction unit.

It is useful that in the remote transmission system the second input of the multiplier of the correction unit should be connected to the output of the circuit for determination of polarity of mismatch signal of shafts of the master and slave synchronous motors of the unit assigning orientation of stator magnetic fields of the master and slave synchronous motors.

It is effective that in the remote transmission system the second input of the multiplier in the correction unit should be connected to the output of the circuit for determination of polarity of the shaft mismatch signal of the master and slave synchronous motors of the unit for determination of the assigned shaft mismatch of the master and slave synchronous motors.

The system for remote transmission of the angular position and effort between the master and slave shafts makes it possible to control the scale factor of efforts transmitted to the master shaft and, by this, to broaden the range of load variations on the slave shaft, within which the biotechnical operator-manipulator system is capable of operating. Within this load control range the operator finds himself in much more comfortable working environment and more fit to cope with fatigue. Moreover, the accuracy of the angular position remote transmission becomes much higher and, consequently, the length of one operation is cut down. The quality of performance is also improved, and the range of applications of the system is made much broader.

BRIEF DESCRIPTION OF THE DRAWINGS

The invention will now be described in greater detail with reference to specific embodiments thereof and accompanying drawings wherein:

FIGS. 5a, b, c, d, e, f are vector diagrams of magnetic fields of stators and rotors of the master and slave synchronous motors in various modes of operations, the motor windings being connected in opposition;

FIGS. 6a, b, c, d, e, f are vector diagrams shown in FIG. 5 when motor windings of the master and slave synchronous motors are connected in aiding; and FIGS. 7a, b, c, d, e, f are vector diagrams of FIG. 6 when the angle between the magnetic fields of the rotor and stator of the master and slave synchronous motors is less than 90°.

DESCRIPTION OF THE PREFERRED EMBODIMENTS

Figure 1:
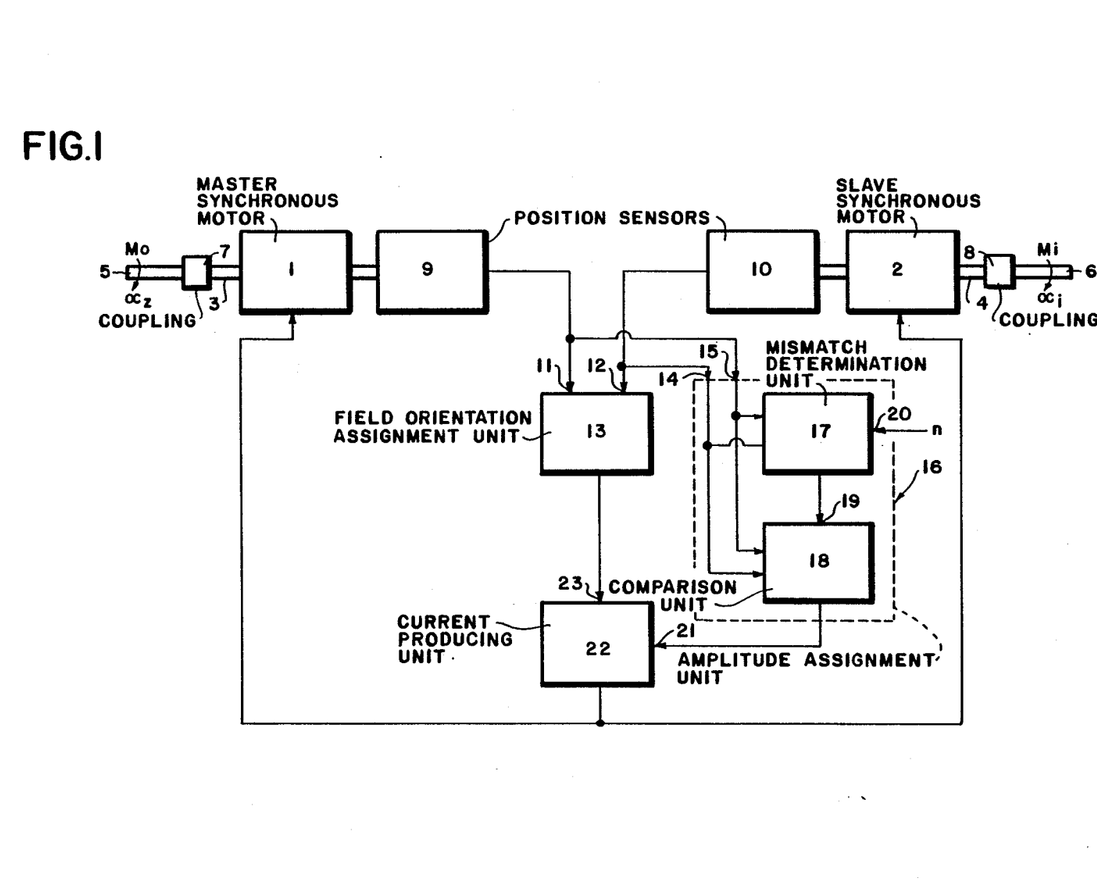
FIG. 1 shows a functional block diagram of a system for remote transmission of the angular position and effort from master to slave shaft, according to the invention.

The system for remote transmission of the angular position and effort between input and output shafts comprises master and slave synchronous motors 1 and 2 (FIG. 1) having shafts 3 and 4 connected respectively to master and slave shafts 5 and 6, in this embodiment via couplings 7 and 8. To reduce the speed of master and slave synchronous motors 1 and 2, their shafts 3 and 4 are connected to the master and slave shafts 5 and 6 via reduction gears (not shown). Position sensors 9 and 10 are installed on the shafts 3 and 4 of the synchronous motors 1 and 2 and electrically connected to inputs 11 and 12 of a unit 13 for assigning the orientation of magnetic fields of stators of the master and slave synchronous motors 1 and 2. In this embodiment of the invention, position sensors 9 and 10 are directly connected to inputs 11 and 12 of the orientation assignment unit 13. The outputs of the position sensors 9 and 10 are also connected to information inputs 14 and 15 of a device 16 for assigning the amplitude of stator magnetic fields of the master and slave synchronous motors. These information inputs 14 and 15 are respective information inputs of a unit 17 for determination of the assigned mismatch of the shafts of the master and slave synchronous motors and of a comparison unit 18 whose setting input 19 is connected to the output of the unit 17 for determination of the assigned shaft mismatch. The unit 17 for determination of the assigned shaft mismatch has a setting input 20 to which a signal is applied, which corresponds to a scale factor n of the force transmitted to the shaft 3 of the master synchronous motor 1. The output of the comparison unit 18 functions as the output of the device 16 for assigning the amplitude of stator magnetic fields and is electrically connected to a control input 21 of a unit 22 producing current in the windings of the master and slave synchronous motors. A setting input 23 of a unit 22 is connected to the output of the unit 13 for assigning the orientation of stator magnetic fields. In this embodiment, the output of the comparison unit 18 is directly connected to the control input 21 of the unit 22 producing current in the windings. The number of the current producing units 22 is equal to the number of windings of each synchronous motor 1 and 2, and the outputs thereof are connected to the windings of said synchronous motors 1 and 2, respective windings being connected to one another. Since the number of windings of the synchronous motor 1 is equal to that of the windings of the synchronous motor 2, and different types of synchronous motors are equipped with different number of such windings, no windings are shown in FIG. 1. Connection of the current producing unit 22 with the windings and electrical connection between windings are conventionally shown as one line.

To achieve more accurate transmission of the angular position and force between the master and slave shafts 5 and 6, the output of the comparison unit 18 is connected to the input of a correction unit 24 (FIG. 2) whose output is connected to the control input 21 of the unit 22 producing current in windings. Outputs of the position sensors 9 and 10 are connected to information inputs 25 and 26 of a switching device 27 whose control input 28 is connected to the output of a circuit 29 for determination of the polarity of the mismatch signal. One input of the circuit 29 is connected to the setting input 20 of the unit 17 for determination of the assigned mismatch of the shafts, while the other input 30 thereof receives a signal proportional to the ratio $M_{pi}/M_{pz}$ of starting torques of the master and slave motors 1 and 2.

The unit 13 for assigning the orientation of stator magnetic fields comprises a circuit 31 (FIGS. 3A and 3B) for determination of polarity of the mismatch signal of shafts of the master and slave synchronous motors. In this embodiment this circuit 31 is built around a comparison element 32 whose inputs are the inputs 11 and 12 of the orientation assigning unit 13, and a relay element 33 whose input is connected to the output of the comparison element 32. The relay element 33 is constructed so that when a positive signal is applied to the input thereof, the output signal is "−1", and when a negative signal is applied to the input thereof, the output signal is "+1". The output of the relay element 33 is the output of the circuit 31 for determination of polarity of the mismatch signal and is connected to a particular input of a multiplier 34. A signal proportional to the angle between the magnetic fields of the rotor and stator of the master or slave synchronous motors 1 or 2, which in this embodiment is equal to 90°, is supplied to the setting input of the multiplier 34 whose output is connected to a particular input of an adder 35 having its other input connected to a particular input of the polarity determination circuit 31, that is the comparison element 32, while the output thereof is the output of the unit 13 for assigning the orientation of magnetic fields of stators.

Figure 3A:
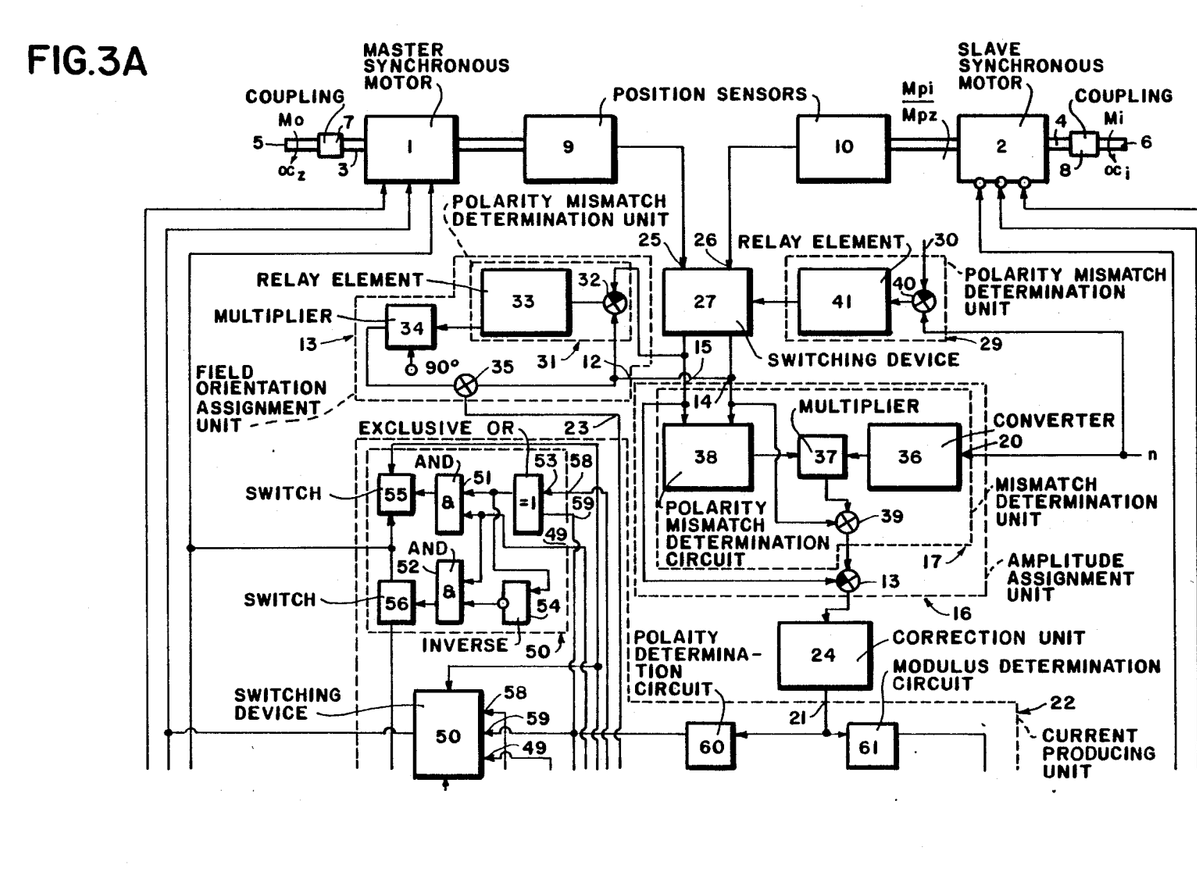
FIGS. 3A and 3B shows the functional block diagram of FIG. 2 featuring functional diagrams of a unit producing current in the windings of master and slave synchronous motors, a unit for determination of the assigned shaft mismatch of the master and slave synchronous motors, and a unit for assigning the orientation of magnetic fields of stators of the master and slave synchronous motors, according to the invention.
Figure 3B:
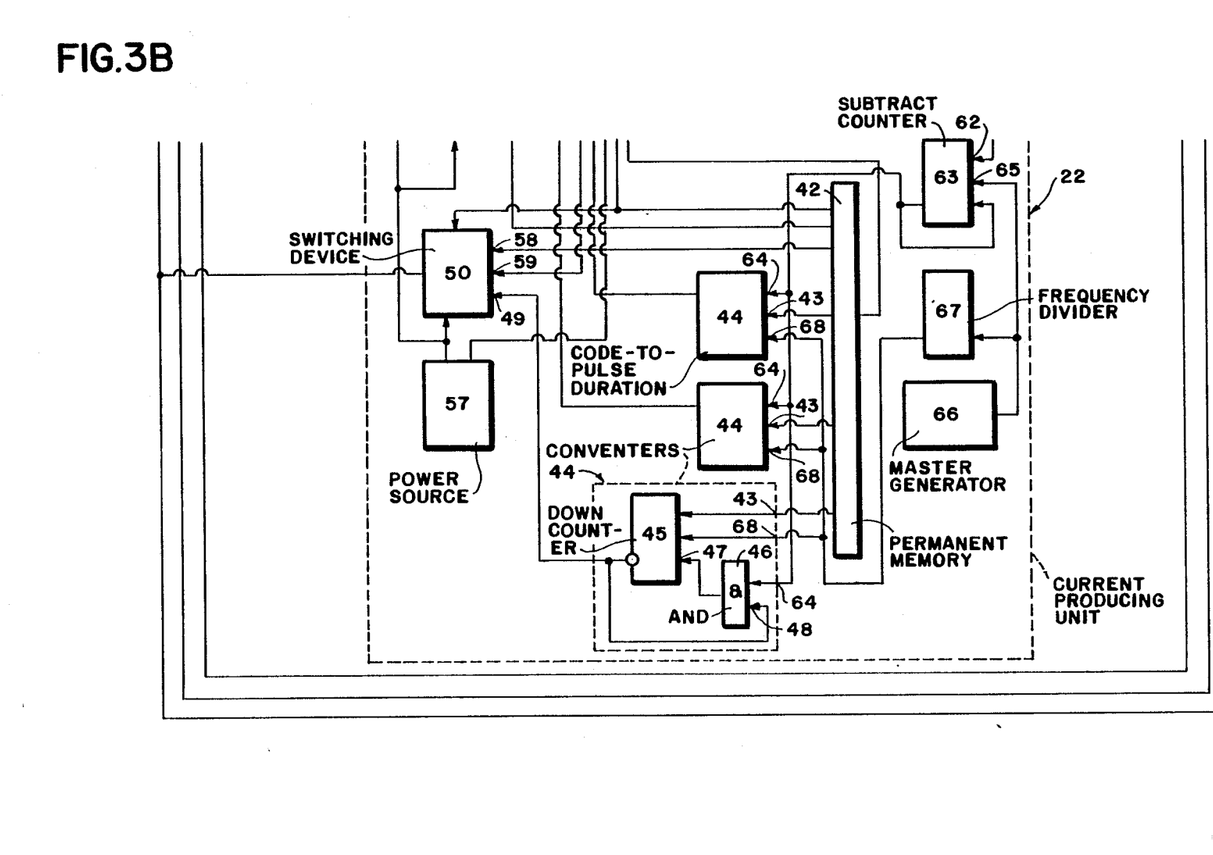

The unit 17 for determination of the assigned shaft mismatch comprises a converter 36 of the force scale factor into the angle between the magnetic fields of the rotor and stator of the master or slave synchronous motor, whose input is the setting input 20 of the unit 17 for determination of the assigned shaft mismatch, while the output thereof is electrically connected to a particular input of a multiplier 37. In this embodiment the output of the unit 17 is directly connected to the multiplier 37 whose other input is connected to the output of a circuit 38 for determination of the polarity of the mismatch signal of shafts of the master and slave synchronous motors. Inputs of the circuit 38 are information inputs of the unit 17 for determination of the assigned shaft mismatch. The circuit 38 for determination of polarity of the shaft mismatch signal is structured like the circuit 31. The output of the multiplier 37 is connected to a particular input of an adder 39 whose other input is connected to a particular input of the circuit 38 for determination of polarity of the shaft mismatch signal. In this embodiment, the input of the adder 39 is connected to the input of the polarity determination circuit 38 and functions as the information input 14 of the device 16 for assigning the amplitude of stator magnetic fields. The output of the adder 39 is the output of the unit 17 for determination of the assigned shaft mismatch. In this embodiment of the unit 17 for determination of the assigned shaft mismatch, the comparison unit 18 is built around a comparison element whose one input is connected to the input of the unit 38 for determination of polarity of the shaft mismatch signal, which is the information input 15 of the device 16 for assigning the amplitude of stator magnetic fields.

The circuit 29 for determination of polarity of the shaft mismatch signal is structured like circuits 31 and 38 and comprises a comparison element 40 and a relay element 41 connected in series.

The structure of the unit 17 for determination of the assigned shaft mismatch is determined by the type of connection of respective windings of the master and slave synchronous motors 1 and 2. In this embodiment, respective windings of the synchronous motors 1 and 2 are connected in opposition, as shown in FIS. 3A and 3B. This connection may be either parallel or series connection. In addition, FIGS. 3A and 3B shows that three-phase synchronous motors are used, each having three windings. The structure of the unit 22 producing current in the windings, as shown in FIGS. 3A and 3B, is dictated by the fact that information on the amplitude and orientation of magnetic fields of stators of the synchronous motors 1 and 2 is supplied as codes to the control and setting inputs 21 and 23 of the unit 22.

The setting input 23 of the unit 22 producing current in the windings is the address input of a permanent memory 42 wherein codes of duration and polarity of supply pulses for the windings of the synchronous motors 1 and 2 are stored. The output line of the permanent memory 42 is connected to control inputs 43 of code-to-pulse-duration converters 44 whose number is equal to the number of windings of each synchronous motor 1 and 2. Each converter 44, in this embodiment of the invention, comprises a down counter 45 whose setting input is the control input 43 of the converter 44, and a two-input AND logical element 46 whose output is connected to a subtracting input 47 of the down counter 45. The inverting borrow output of the subtract (down) counter 45 is connected to an input 48 of the logical AND element 46 and is the output of the converter 44. For simplicity, the schematic of only one converter 44 is shown in FIGS. 3A and 3B in the block diagram of the unit 22 producing current in the windings.

Outputs of all converters 44 are connected to inputs 49 for assigning the duration of pulses of switching devices 50 whose number is equal to the number of windings of each synchronous motor 1 or 2. Each switching device 50, in this embodiment of the invention, comprises two two-input AND elements 51 and 52 whose first inputs are joined together and function as the input 49 of the switching device 50. The second input of the AND element 51 is connected to the output of an exclusive OR element 53 also connected to the input of an inverter 54. The output of the inverter 54 is connected to the second input of the AND element 52. The outputs of the AND logical elements 51 and 52 are connected to control inputs of switches 55 and 56 whose power inputs are connected to a power source 57, while the outputs thereof are joined together and function as the output of the switching device 50, which is connected, as described above, to respective windings of the master and slave synchronous motors 1 and 2.

The first input of the exclusive OR element 53 is an input 58 assigning polarity of pulses of the switching device 50 and is connected to a respective output of the permanent memory 42, while the second input thereof is a setting input 59 connected to the output of a circuit 60 for determination of polarity of control signal. The input of the circuit 60 is connected to an input of a circuit 61 for determination of the modulus of the control signal. The joined inputs of the circuits 60 and 61 are the control input 21 of the unit 22 producing current in the windings. Inputs 59 of all switching devices 50 are joined together. For simplicity, FIGS. 3A and 3B shows the schematic of only one switching device 50 in the block diagram of the unit 22.

The output of the circuit 61 for determination of the modulus (absolute value) of the control signal is connected to a setting input 62 of a subtract counter 63 whose borrow output is connected to a recording input and pulse frequency setting inputs 64 of the code-to-pulse-duration converters 44. The input 64 is the second input of the AND element 46. A subtract input 65 of the subtract counter 63 is connected to an output of a master generator 66, which is also connected to an input of a frequency divider 67. The output of the frequency divider 67 is connected to recording inputs 68 of the converters 44.

When the windings of the master and slave synchronous motors 1 and 2 are connected in series or parallel aiding, the unit 17 for determination of the assigned shaft mismatch comprises an adder 69 (FIG. 4) having one particular input connected to the output of the converter 36 of the force scale factor into the angle between the magnetic fields of the rotor and stator of the master or slave synchronous motor, while a signal applied to the other input thereof is proportional to the 90° angle of rotation of the magnetic field of the stator of the master or slave synchronous motor 1 or 2, and the output of the unit 17 is connected to the input of the multiplier 37.

The system for remote transmission of the angular position and force from the master to slave shaft can be made simpler by providing the unit 13 for assigning orientation of stator magnetic fields and the unit 17 for determination of the assigned shaft mismatch with a common circuit 70 for determination of polarity of the shaft mismatch signal of the master and slave synchronous motors. This circuit 70 is made similar to the circuits 31 (FIGS. 3A and 3B, and 38 for determination of polarity).

Figure 4:
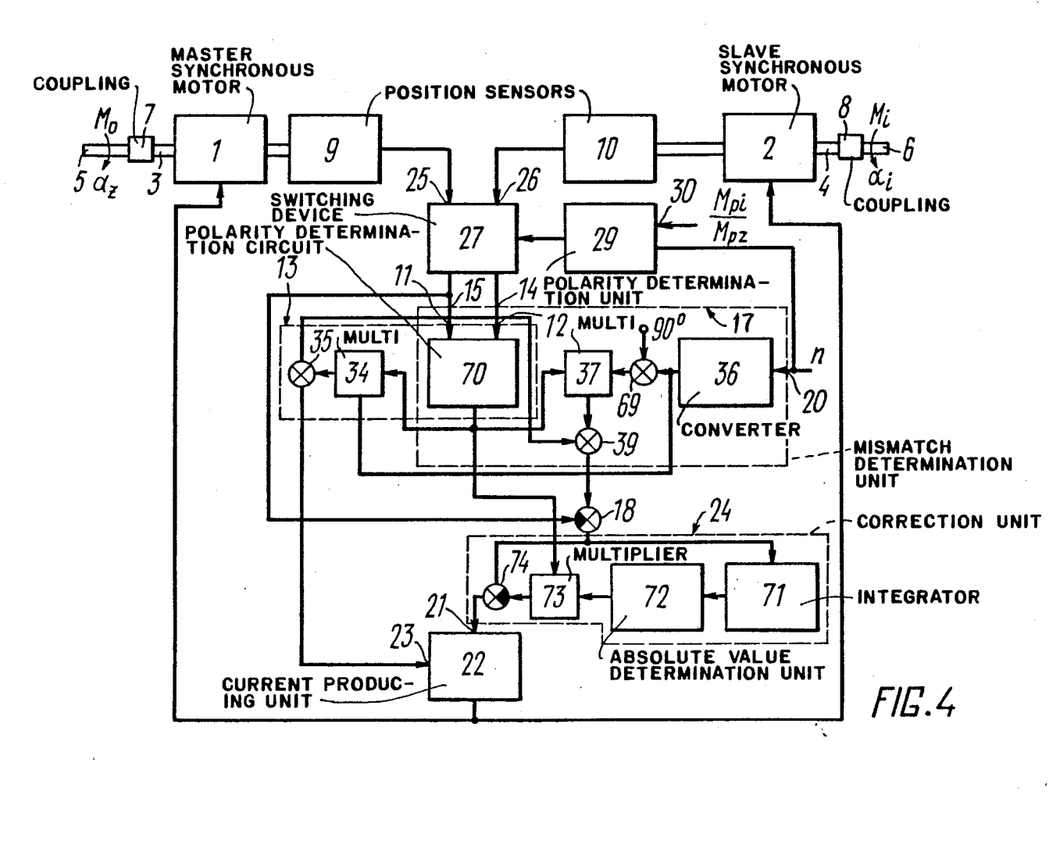
FIG. 4 shows the functional block diagram of FIG. 2 featuring functional diagrams of a unit for assigning the orientation of magnetic fields of stators of the master and slave synchronous motors and a unit for determination the assigned mismatch of shafts of the master and slave synchronous motors and a circuit, shared by said two units, for determination of polarity of the shaft mismatch signal of the master and slave synchronous motors, and of a correction unit, according to the invention.

In the embodiment of the remote transmission system shown in FIG. 4, the output of the converter 36 of the force scale factor into the angle between the magnetic fields of the rotor and stator of the master or slave synchronous motor is connected to said setting input of the multiplier 34.

The correction unit 24 (FIG. 4) comprises an integrator 71 having its output connected to an input of a circuit 72 for determination of the absolute value of the signal. The output of the circuit 72 is connected to a first input of a multiplier 73 whose second input receives a signal corresponding to the polarity of the mismatch signal of the shafts 3 and 4 of the master and slave synchronous motors 1 and 2. In this embodiment, the second input of the multiplier 73 is connected to the output of the circuit 70 for determination of polarity of the mismatch signal. The output of the multiplier 73 is connected to the first input of a comparison circuit 74 whose second input is connected to the input of the integrator 71, their connection point being the input of the correction unit 24. The output of the comparison circuit 74 is the output of the correction unit 24.

In alternative embodiments, the second input of the multiplier 73 is connected either to the output of the circuit 31 (FIGS. 3A and 3B) for determination of polarity of the mismatch signal or to the output of the circuit 38 for determination of polarity of the mismatch signal (these connections are not shown in drawings).

Figure 5:
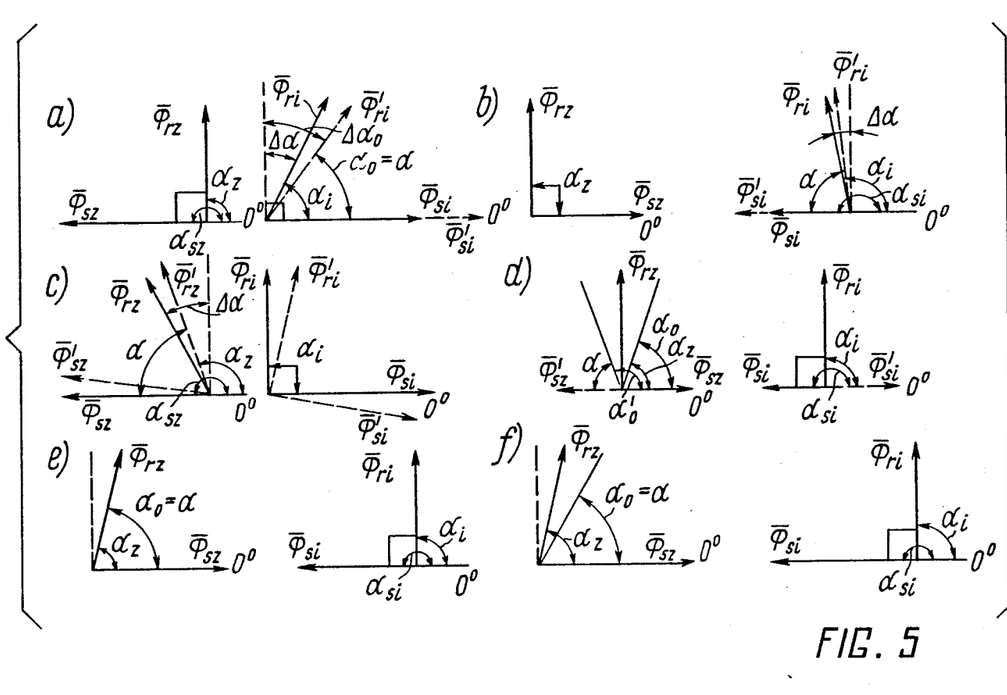
Figure 6:
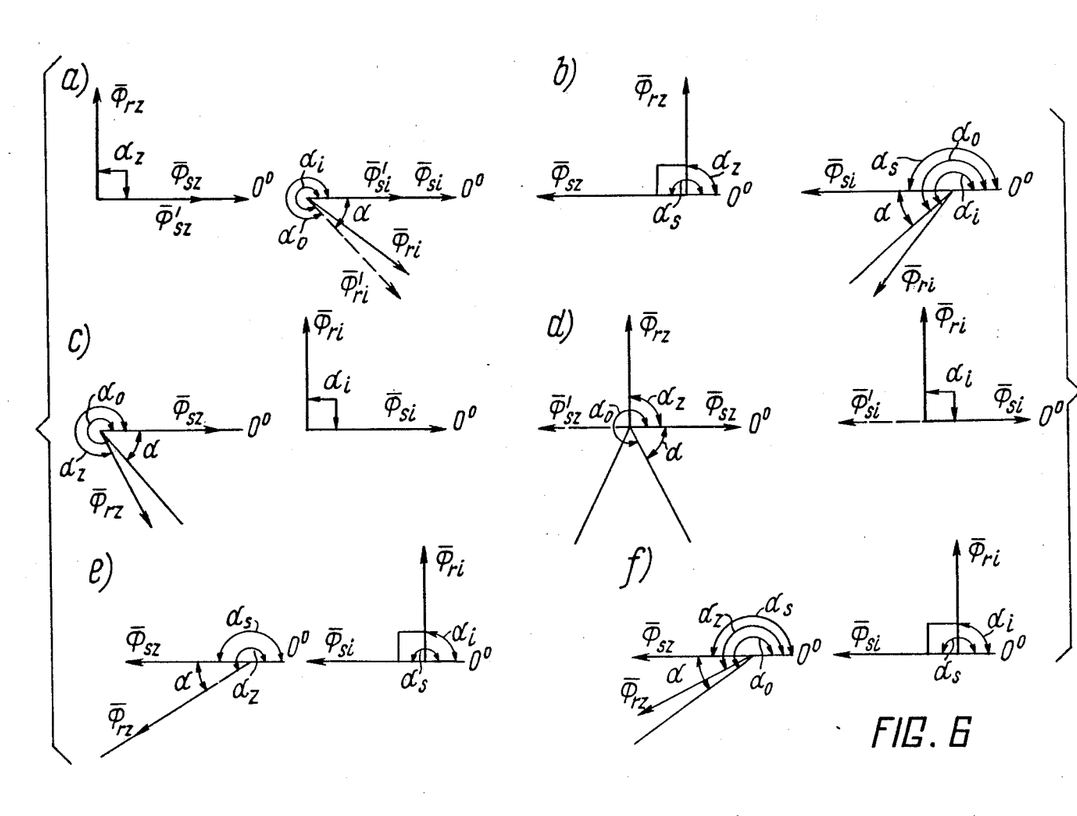
Figure 7:
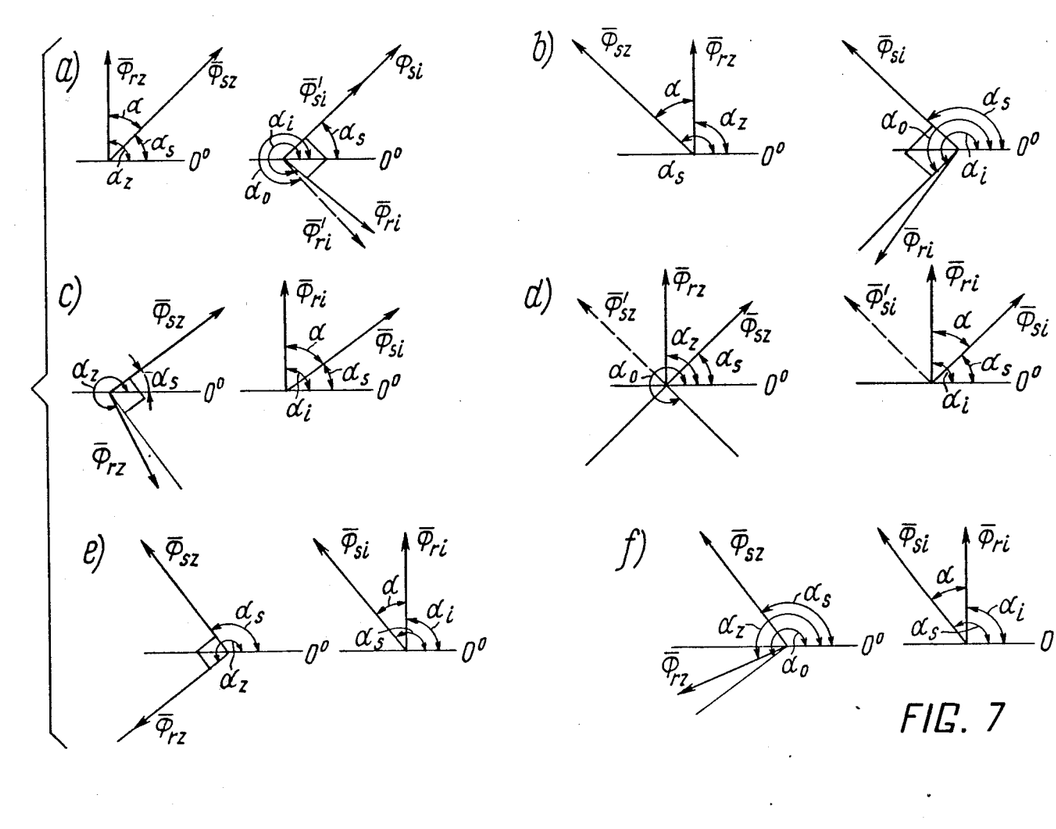

For better understanding of the operation of the system for remote transmission of the angular position and force between the master and slave shafts, FIGS. 5, 6 and 7 show vector diagrams a,b,c,d,e,f of rotor magnetic fields $\Phi_{rz}$ and $\Phi_{ri}$ of respective master and slave synchronous motors, and respective stator magnetic fields $\Phi_{sz}$ and $\Phi_{si}$ of the master and slave synchronous motors in different modes of operation of the remote transmission system.

The system for remote transmission of the angular position and force between master and slave shafts operates, according to the invention, as follows.

The operator sets a specific force scale factor n which is equal to a quantity which is the reverse of the ratio of the moment $M_o$ applied by the operator to the master shaft 5 (FIG. 1) to the moment $M_i$ applied by the load to the slave shaft 6. The unit 13 for assigning orientation of stator magnetic fields of the master and slave synchronous motors operates in conformity with the signals of the position sensors 9 and 10 and dictates the orientation of the magnetic fields $\overline{\Phi}_{sz}$ and $\overline{\Phi}_{si}$ of the stators of the master and slave synchronous motors 1 and 2 so that, with the quantity n being constant, the angle between one of the rotor magnetic field $\overline{\Phi}_{rz}$ or $\overline{\Phi}_{ri}$ and the respective stator magnetic field $\overline{\Phi}_{sz}$ or $\overline{\Phi}_{si}$ is kept constant or varied within the range dictated by the electromagnetic time constant of the synchronous motors 1 and 2. This can be achieved, for example, by producing, in the windings of the synchronous motors 1 and 2, voltages whose vector sum makes a constant angle with $\overline{\Phi}_{rz}$ or with $\overline{\Phi}_{ri}$. This angle may be equal to 90°, for instance. In case the stator windings are connected in parallel opposition, possible orientations of the magnetic fields of the rotors and stators of the synchronous motors 1 and 2 may be as shown in FIG. 5 (a,b,c,d,e,f). The rotational moments (or torques) $M_1$ and $M_2$ of the master and slave synchronous motors 1 and 2 are given by:

$$\begin{cases} M_1 = K_1 \Phi_{rz} \Phi_{sz} \sin(\overline{\Phi}_{rz}, \overline{\Phi}_{sz}) \\ M_2 = K_2 \Phi_{ri} \Phi_{si} \sin(\overline{\Phi}_{ri}, \overline{\Phi}_{si}), \end{cases} \quad (1)$$

where $K_1$ and $K_2$ are coefficients dictated by the design of the synchronous motors 1 and 2, specifically, by the shape of their rotors and stators, the air gap width, dimensions of the synchronous motors. If the amplitudes of the rotor magnetic fields $\Phi_{rz}$ and $\Phi_{ri}$ are assumed to be constant and the ratio of the stator magnetic fields $_{sz}$ and $_{si}$ is kept constant, which is possible when the speed of rotation of the shafts 3 and 4 of the synchronous motors 1 and 2 is equal to zero, any ratio of $M_2$ to $M_1$ can be obtained, as shown in (1), by varying the angles between the magnetic fields of rotors and stators of the synchronous motors 1 and 2. This $M_2/M_1$ ratio can be taken as equal to the force scale factor if torques opposing rotation of the shafts 3 and 4 are neglected. Such opposing moments can be produced in the couplings 7 and 8.

The desired ratio of the sines of angles between the magnetic fields of rotors and stators of the master and slave synchronous motors 1 and 2 can be achieved by means of the device 16 for assigning the amplitude of the stator magnetic fields of the master and slave synchronous motors 1 and 2. In this case, the unit 17 for determination of the assigned shaft mismatch of the master and slave synchronous motors calculates the assigned mismatch of the shafts 3 and 4 of the synchronous motors 1 and 2, taking into account the scale factor n and actual angles $\alpha_z$ and $\alpha_i$ of the master and slave synchronous motors 1 and 2. This mismatch should provide the ratio of $M_i$ to $M_o$ equal to n. A signal corresponding to the assigned mismatch of the shafts 3 and 4 is applied to the setting input 19 of the comparison unit 18 which compares this signal with the signal corresponding to the actual mismatch $(\alpha_z - \alpha_i)$. The total difference signal is supplied to the control input 21 of the unit 22 producing current in the windings of the master and slave synchronous motors 1 and 2. The values $\Phi_{sz}$ and $\Phi_{si}$ are changed so that the ratio $M_i/M_o$ is brought closer to the force scale factor n. In this manner the coordinated operation of the unit 13 for assigning orientation and magnetic fields and the device 16 for assigning the amplitude of the magnetic fields makes it possible to effect remote bidirectional transmission of the angular position (angle of rotation) and force between the master and slave shafts 5 and 6. In this case $\overline{\Phi}_{sz}$ and $\overline{\Phi}_{si}$ rotate at the same speed, and, when the angles $(\overline{\Phi}_{rz}, \overline{\Phi}_{sz})$ or $(\overline{\Phi}_{ri}, \overline{\Phi}_{si})$ grow from zero to 90°, the quantities of $M_1$ and $M_2$ increase in accordance with the equation (1).

The correction unit 24 (FIG. 2) is inserted into the system in order to make transmission of the angular position and force more accurate. The input signal of the correction unit 24 is the signal corresponding to the deviation of the actual mismatch of the shafts 3 and 4 from the assigned value available at the output of the comparison unit 18. In this embodiment of the system, the correction unit 24 is designed so that the balance sets in only when the output signal of the comparison unit 18 is brought to zero, that is when the orientation of $\overline{\Phi}_{rz}, \overline{\Phi}_{sz}$ and $\overline{\Phi}_{ri}, \overline{\Phi}_{si}$ is a conformity with the following ratio:

$$n = M_i/M_o \quad (2)$$

The correction unit 24 can be made very simple when built around an integrator or a relay capable of balancing out various disturbances.

The $M_2/M_1$ ratio can be written according to equation (1) as follows:

$$n' = \frac{M_2}{M_1} = \frac{K_2 \Phi_{ri}}{K_1 \Phi_{rz}} \cdot \frac{\Phi_{si}}{\Phi_{sz}} \cdot \frac{\sin(\overline{\Phi}_{ri}, \overline{\Phi}_{si})}{\sin(\overline{\Phi}_{rz}, \overline{\Phi}_{sz})}, \quad (3)$$

If one of the angles $(\overline{\Phi}_{ri}, \overline{\Phi}_{si})$ or $(\overline{\Phi}_{rz}, \overline{\Phi}_{sz})$ is made equal to 90°, the coefficient n' ranges as follows:

$$\begin{cases} 0 \leq n' \leq \dfrac{K_2 \Phi_{ri} \Phi_{si}}{K_1 \Phi_{rz} \Phi_{sz}} & \text{with } (\overline{\Phi}_{rz}, \overline{\Phi}_{sz}) = 90° \\ \dfrac{K_2 \Phi_{ri} \Phi_{si}}{K_1 \Phi_{rz} \Phi_{sz}} \leq n' \leq \infty & \text{with } (\overline{\Phi}_{ri}, \overline{\Phi}_{si}) = 90°, \end{cases} \quad (4)$$

where quantities $\Phi_{sz}$ and $\Phi_{si}$ are assumed to be constant. Since it is economically profitable to keep one of the angles between the magnetic fields of rotors and stators of the synchronous motors equal to 90°, the range of the coefficient n' (3) can be made broader. This coefficient n' can be taken equal to the force scale factor n (2) if the resistance to the rotation of the master and slave shafts 5 and 6 is disregarded. To this end, the magnetic fields of the rotor and stator in either master motor 1 or slave motor 2 should be positioned normally to each other in conformity with equation (4). The selection of either master motor 1 or the slave motor 2 is dictated by the switching device 27 controlled by the circuit 29 for determination of polarity of the mismatch signal which depends on the difference between the quantity n supplied to the setting input 20 of the unit 17 and the ratio $M_{pi}/M_{pz}$ of starting torques of the synchronous motors 2 and 1. This ratio is equal to the ratio $$\frac{K_2 \Phi_{ri} \Phi_{si}}{K_1 \Phi_{rz} \Phi_{sz}}$$

with the values $\Phi_{si}$ and $\Phi_{sz}$ being maximum and the rotational speed of the shafts 3 and 4 being zero. When windings are connected in parallel or in series, in either opposition or aiding connection, and when the rotational speed of the shafts 3 and 4 is zero, the ratio $\Phi_{si}/\Phi_{sz}$ is constant for two selected synchronous motors 1 and 2. Consequently, in an actual system for remote transmission of the angular position and force the ratio of amplitudes of magnetic fields can be replaced in equation (4) by the ratio of starting torques. In addition, the synchronous motor 1 or 2 operating with perpendicular magnetic fields of the rotor and stator can be selected in equation (4). In this case, the switching device 27 connects the output of the position sensor 9 to the input 11 or 12 of the unit 13 for assigning orientation of magnetic fields and, respectively, to the input 15 or 14 of the device 16 for assigning the amplitude of the magnetic fields. Simultaneously, the output of the position sensor 10 is connected to the input 12 or 11 of the unit 13 for assigning orientation of magnetic fields and, respectively, to the input 14 or 15 of the device 16 for assigning the amplitude of magnetic fields.

Figure 2:
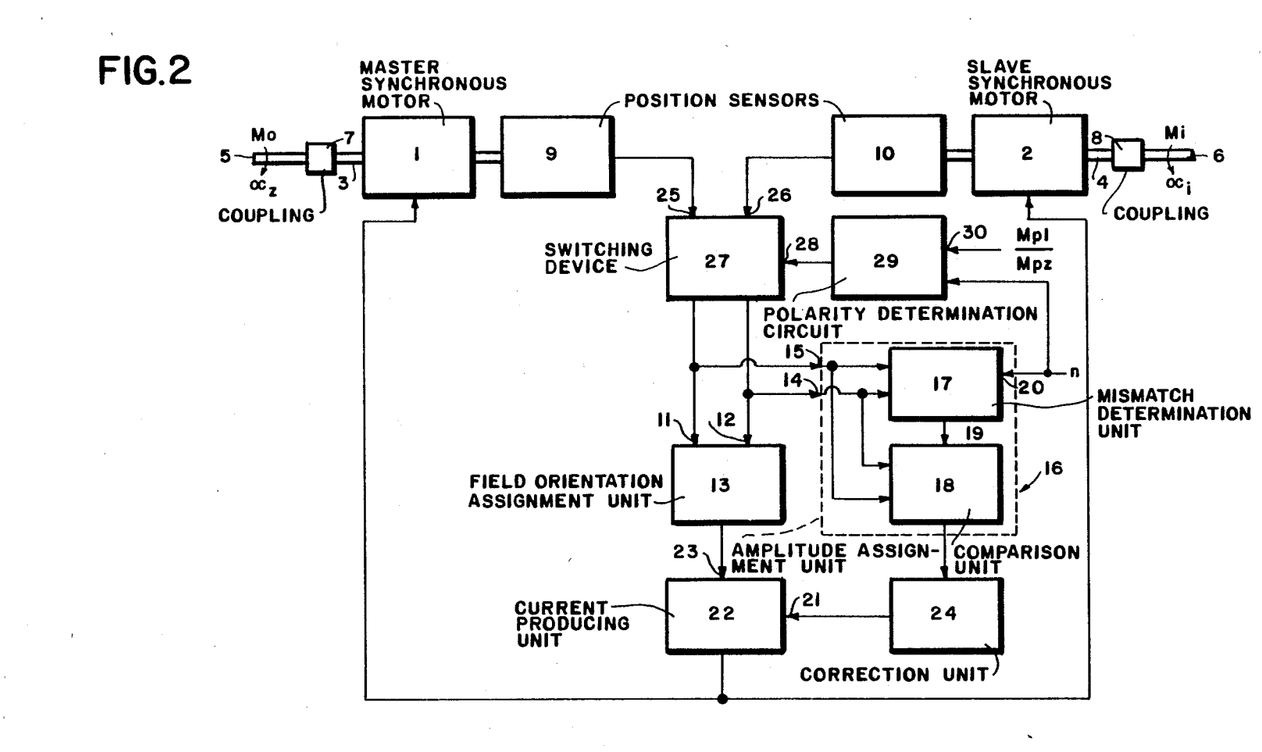
FIG. 2 shows the functional block diagram of FIG. 1, wherein the system is equipped with a correction unit, a switching device, and a circuit for determination of polarity of the mismatch signal, according to the invention.

The operation of the system for remote transmission of the angular position and force, shown in FIG. 2, can be explained by the vector diagrams of FIG. 5 when the stator windings of the synchronous motors 1 and 2 are connected in opposition. Let us assume that the force scale factor n is set to comply with the equation (2) with $\alpha_i = \alpha_o$ (FIG. 5a). In this case, the angle $(\overline{\Phi}_{rz}, \overline{\Phi}_{sz})$ is equal to 90°, thus meeting the first condition of equation (4). Equation (3) can then be rewritten as follows:

$$n' = \frac{K_2 \Phi_{ri} \Phi_{si}}{K_1 \Phi_{rz} \Phi_{sz}} \sin(\overline{\Phi}_{ri}, \overline{\Phi}_{si}). \quad (5)$$

Disregarding the resistance to the shaft rotation and assuming that n'=n, for the angle $\alpha$ between the magnetic fields $\Phi_{ri}$, $\Phi_{si}$ of the rotor and stator, with which n'=n, one can obtain from equation (5) that:

$$\alpha = \arcsin\left(\frac{nK_1\Phi_{rz}\Phi_{sz}}{K_2\Phi_{ri}\Phi_{si}}\right). \tag{6}$$

This means that the assigned mismatch $\Delta\alpha$ is equal to (90°−α), the actual mismatch is ($\alpha_z - \alpha_i$), and the output of the comparison unit 18 (FIG. 2) is the difference signal equal to (90°−α−$\alpha_z$+α). The orientation $\overline{\Phi}_{ri}$ to be obtained to attain n'=n is indicated as $\alpha_o$. Owing to the correction unit 24, the amplitude $\Phi_{ri}$, $\Phi_{si}$ increases until the decrease of the angle ($\overline{\Phi}_{ri}$, $\overline{\Phi}_{si}$) results according to equation (1) to a new balance, but with ($\overline{\Phi}_{ri}$, $\overline{\Phi}_{si}$)=α. It is assumed that $M_i$ is constant and the balance $M_2=M_i$ can be attained with a larger $\Phi_{si}'$ of the magnetic field of the stator of the slave synchronous motor 2, when ($\Phi_{si}' > \Phi_{si}$) and, consequently, with larger $M_1$ in conformity with equation (1). In this manner, the initially upset balance n'=n (as shown in FIG. 5a) is restored in some time to the equality n'=n. The operator has to increase the torque $M_o$ to keep the master shaft 5 (FIG. 2) in a stationary position.

Let us assume that the initial orientations of the magnetic fields $\overline{\Phi}_{ri}$, $\overline{\Phi}_{si}$ of the slave synchronous motor 2 are arranged as shown in FIG. 5a by a dotted line. If the load applied to the slave shaft 6 increases, that is the torque $M_i$ increases, the shaft 4 of the slave synchronous motor 2 is turned counterclockwise and $\overline{\Phi}_{ri}$ is oriented as shown in the same diagram by solid lines. This means that the angle between the magnetic fields of the rotor and stator of the slave synchronous motor 2 grows from α to $\alpha_i$, and, consequently, $M_i$ grows according to equation (1). The comparison unit 18 produces a signal corresponding to the growing mismatch which eventually, by the transition process described above, results in making the angle ($\overline{\Phi}_{ri}, \overline{\Phi}_{si}$) equal to zero but with a larger amplitude $\overline{\Phi}_{si}$, and, consequently, $\overline{\Phi}_{sz}$, since the stator windings of the synchronous motors 1 and 2 are electrically connected. To summarize any increase of $M_i$ results in the increase of $M_1$ and, consequently, $M_o$. That is the force applied to the slave shaft 6 is transmitted to the master shaft 5.

When the direction of the torque $M_i$ changes, the configuration of the magnetic fields after the transient processes is altered as shown in FIG. 5b. The initial configuration of the magnetic fields of the rotor and stator of the slave synchronous motor 2 is assumed to be as shown by dotted lines (vectors $\overline{\Phi}_{ri}$, $\overline{\Phi}_{si}$). Let us assume that $M_i$ has diminished. $M_2$ becomes more than $M_i$. $\Phi_{si}$ remains constant and, consequently, $\overline{\Phi}_{ri}$ rotates counterclockwise, thus taking the position $\overline{\Phi}_{ri}$. Owing to the reasons described above the comparison unit 18 generates a mismatch signal and the correction unit 24 makes $\Phi_{sz}$ and $\Phi_{si}$ decrease, which means the decrease of $M_1$ and $M_2$ in conformity with equation (1). The shaft 4 of the synchronous motor 2 is turned by the torque $M_i$ clockwise until the condition ($\overline{\Phi}_{ri}, \overline{\Phi}_{si}'$)=α. Let us assume that the operator increased the force scale factor n. Now the first condition of equation (4) is satisfied. The switching device 27 operates as described above and switches the outputs of the position sensors 9 and 10 because the output signal of the circuit 29 for determination of polarity of the mismatch signal changed due to the change of the force scale factor n. Configuration of the magnetic fields for this arrangement in different modes of operation is shown in FIGS. 5c, d, e, f.

FIG. 5c shows altered configuration of the magnetic fields of the synchronous motors 1 and 2 when the torque $M_o$ produced by the operator decreases or when the master shaft 5 rotates. The initial configuration of the magnetic fields of the synchronous motors 1 and 2 is shown in FIG. 5c by dotted lines; this refers to $\overline{\Phi}_{rz}'$, $\overline{\Phi}_{sz}'$, $\overline{\Phi}_{si}'$. The master shaft 5 is assumed to have been turned counterclockwise so that the rotor magnetic field of the synchronous motor 1 changed its position from $\overline{\Phi}_{ri}'$ to position $\overline{\Phi}_{ri}$ indicated by a solid line. The angle ($\overline{\Phi}_{rz}$, $\overline{\Phi}_{sz}$) becomes less, since the orientation of $\overline{\Phi}_{sz}$ is initially the same. The output mismatch signal of the comparison unit 18 changes resulting in the decrease of the magnetic fields of the stators of the master and slave synchronous motors 1 and 2. Since the load torque $M_i$ remains unaltered and the torque $M_2$ decreases, the moment $M_i$ turns the slave shaft 6 counterclockwise, and, while, $\overline{\Phi}_{ri}'$ changes its position for $\overline{\Phi}_{ri}$ indicated by a solid line, the magnetic fields $\overline{\Phi}_{si}'$ and $\overline{\Phi}_{sz}'$ change for $\overline{\Phi}_{si}$ and $\overline{\Phi}_{sz}$ respectively. If the slave shaft 6 is locked in this position, the balance sets in after the transient process similar to that described for FIGS. 5a, b and the orientation of the magnetic fields of the synchronous motors 1 and 2 becomes as follows: $\overline{\Phi}_{rz}'$, $\overline{\Phi}_{sz}$, $\overline{\Phi}_{ri}$, $\overline{\Phi}_{si}$.

In this manner the angular position of the master shaft 5 is transmitted to the slave shaft 6. It is understood that if the initial position of the magnetic fields is assumed to be the one shown by the dotted lines and the slave shaft 6 is assumed to make a turn in the counterclockwise direction, e.g. because the torque $M_i$ increased, the master shaft 5 should turn to the same angle counterclockwise after a transient process similar to the one described above. This means that remote transmission of the angular position can be effected from the slave shaft 6 to the master shaft 5 and all transient processes typical for control of orientation of the stator magnetic fields of the synchronous motors 1 and 2 according to the signals of the position sensor 9 of the shaft 3 of the master synchronous motor 1 may take place when stator magnetic field orientation is controlled in the master or slave synchronous motors 1 and 2 according to the signals of the position sensor 10, taking into consideration the conventional substitution of shafts 5 and 6.

It is evident, in particular, that when the force scale factor n is altered, the processes resulting therefrom are similar but the reason of the generation or alteration of the mismatch signal at the output of the comparison unit 18 is the change of this scale factor n and, consequently, the angle α. It should be noted, however, that for FIGS. 5c, d, e, f, where ($\overline{\Phi}_{ri}$, $\overline{\Phi}_{si}$)=90°, the scale factor is connected with the angle α between $\overline{\Phi}_{rz}$ and $\overline{\Phi}_{sz}$ by the following relationship:

$$\alpha = \arcsin\left(\frac{K_2\, ri\, si}{nK_1\, rz\, sz}\right). \tag{7}$$

Let us now deal with the transient process in the system for remote transmission of the angular position and force when the direction of the torque $M_i$ changes as shown in FIG. 5d. Let us assume that the direction of torque $M_i$ is reversed and now coincides with the direction of $M_2$, the configuration of the magnetic fields remains as in FIG. 5c. In consequence, the fields $\overline{\Phi}_{ri}$ and $\overline{\Phi}_{si}$, $\overline{\Phi}_{sz}$ starts rotating clockwise at a great speed dictated by the sum of the torques $M_2$ and $M_1$. If the operator keeps the master shaft 5 stationary, the magnetic field $\overline{\Phi}_{ri}$ takes in some time the same position as $\overline{\Phi}_{rz}$ (FIG. 5d) and the polarity of the signal corresponding to the difference $(\alpha_z - \alpha_i)$ also changes. As soon as the mismatch signal changes its polarity, the unit 13 (FIG. 2) for assigning orientation of the magnetic fields inverts the stator magnetic fields changing their position from the one indicated by the dotted line ($\overline{\Phi}_{sz}'$, $\overline{\Phi}_{si}'$) to position $\overline{\Phi}_{sz}$, $\overline{\Phi}_{si}$, which means that the direction of the torques $M_1$ and $M_2$ is reversed. The operator immediately feels the change in the direction of the torque $M_i$ and, to keep the master shaft 5 stationary, has to reverse the force $M_o$ applied to the master shaft. In addition, when the polarity of the mismatch signal $(\alpha_z - \alpha_i)$ is reversed, the unit 17 for determination of the assigned mismatch has to change the position of the angle $\alpha_o'$ (FIG. 5d) with which the balance of fields and the equality n'=n had earlier been achieved for a position $\alpha_o$ symmetrical in relation to $\Phi_{rz}$. All further processes occur as described above and a new balance sets in, wherein the output signal of the comparison unit 18 (FIG. 2) is equal to zero.

Configuration of the magnetic fields, which corresponds to this new balance state, is shown in FIG. 5e. In case the moment $M_o$ increases, the magnetic field configuration alters as shown in FIG. 5f and the transient process is repeated exactly as described above.

When the stator windings of the synchronous motors 1 and 2 are in aiding connection, the orientation of their stator magnetic fields may conventionally be taken as similar as shown in FIGS. 6a, b, c, d, e, f and FIGS. 7a, b, c, d, e, f. To ensure opposite directions of the moments $M_1$ and $M_2$, the magnetic fields $\overline{\Phi}_{sz}$ and $\overline{\Phi}_{si}$ should be arranged as if between the magnetic fields $\Phi_{rz}$ and $\Phi_{ri}$ of the rotors of the synchronous motors 1 and 2. If the angle between $\overline{\Phi}_{rz}$ and $\overline{\Phi}_{sz}$ is set to 90° for reasons mentioned above, the angle $\alpha$ between $\Phi_{ri}$ and $\Phi_{si}$ providing the desired scale factor n is given by the equation (6). Orientation of the magnetic fields for a particular mode of operation of the system for remote transmission of the angular position and force is shown in FIG. 6a. Let us denote orientations of the magnetic fields of the synchronous motors 1 and 2 at the initial moment of time as $\overline{\Phi}_{rz}$, $\overline{\Phi}_{sz}$, $\overline{\Phi}_{ri}$, $\overline{\Phi}_{si}$. Let us assume that the master shaft 5 is kept stationary, the load moment $M_i$ decreases, and $\overline{\Phi}_{ri}'$ turns counterclockwise to take the position of $\overline{\Phi}_{ri}$. In this case the moment $M_2$ decreases. The mismatch signal at the output of the comparison circuit 18 corresponds to the angle between the orientation of $\overline{\Phi}_{ri}$ and the actual angle $\alpha_o$. This decreases $\overline{\Phi}_{sz}$ and $\Phi_{si}$ and, consequently, the moment $M_1$. The angle $(\overline{\Phi}_{ri}, \Phi_{si})$ increases until the initial orientation of the magnetic fields is restored with amplitudes $\overline{\Phi}_{sz}'$ and $\overline{\Phi}_{si}'$ of the stator magnetic fields of the synchronous motors 1 and 2 less than the initial values $\overline{\Phi}_{sz}$ and $\overline{\Phi}_{si}$. A similar process occurs when the moment $M_i$ starts increasing. Then $\overline{\Phi}_{ri}$ turns to increase the angle $(\overline{\Phi}_{ri}, \Phi_{si})$ as shown in FIG. 6b. In this case the direction of torques $M_o$ and $M_i$ are taken to be opposite to those shown in FIG. 6b. To restore the upset balance, $\overline{\Phi}_{sz}$ and $\overline{\Phi}_{si}$ are increased, and the shaft 4 of the slave synchronous motor 2 is turned by the effort $M_2 > M_1$ to decrease the angle $(\overline{\Phi}_{ri}, \overline{\Phi}_{si})$ and, consequently, decrease the moment $M_2$. A new balance is attained with larger values of $\overline{\Phi}_{sz}$ and $\overline{\Phi}_{si}$. In this manner the force is transmitted to the master shaft 5.

If the operator raises the force scale factor n so that the second of the two equations (4) is satisfied, the unit 13 for assigning the prientation of magnetic fields, via the unit 22 producing current in windings, makes orientation of $\overline{\Phi}_{sz}$ and $\overline{\Phi}_{si}$ perpendicular to that of $\overline{\Phi}_{ri}$. Processes similar to those shown earlier in FIGS. 5c, d, e, f, occur in the system whose magnetic field configuration is shown in FIGS. 6c, d, e, f. Minor differences may be noticed only in FIG. 6d where, with the stationary position of $\overline{\Phi}_{rz}$, the orientation of $\overline{\Phi}_{rz}$ and $\overline{\Phi}_{ri}$ are matched after $\overline{\Phi}_{ri}$ is turned to an angle less than necessary to change from the state shown in FIG. 5c to the state shown in FIG. 5d.

The system for remote transmission of the angular position and force proposed herein can ensure that the angle between the magnetic fields of the stators and rotors of one of the synchronous motors 1 or 2 is constantly equal to the angle $\alpha$ in conformity with either equation (6) or (7) and can keep the angle between the magnetic fields of the stator and rotor of the other synchronous motor 1 or 2 constantly equal to 90° by converting the output signal of the comparison unit 18 in the correction unit 24. Vector diagrams of orientations of the magnetic fields of the rotors and stators of the synchronous motors 1 and 2, illustrating this case, are shown in FIG. 7a,b,c,d,e,f. The remote transmission system operates in this case like that shown in FIG. 6a, b, c, d, e, f, and the succession of changes from one orientation of magnetic fields to another is also similar. It is evident that in this case the scale factor is equal to a reversed quantity, if the same synchronous motors 1 and 2 are used in FIG. 7 as in FIG. 6, because the angles between $\overline{\Phi}_{rz}$, $\overline{\Phi}_{sz}$ and $\overline{\Phi}_{ri}$, $\overline{\Phi}_{si}$ change their places as compared to FIG. 6 in a balanced state.

The vector diagrams shown in FIG. 5a, b, c, d, e, f describe the operation of the remote transmission system whose one embodiment is shown in FIGS. 3A and 3B. This embodiment of the system operates as follows.

The circuit 31 for determination of polarity of the mismatch signal 20 produces an output signal corresponding to "−1" when a positive signal is available at the output of the comparison element 32, and, on the contrary, an output signal corresponding to "+1" when a negative signal is available at the output of said comparison element 32. A signal corresponding to either −90° or −90° is respectively supplied from the output of the multiplier 34 to be added, in the adder 35, to the output signal of the switching device 27. The signal of the position sensor 9 is supplied to the input of the adder 35 for FIG. 5a,b, whereas for FIG. 5c,d,e,f it is the signal of the position sensor 10. Signals are switched by the switching device 27 as described above in accordance with the signal of the circuit 29 for determination of polarity, which compares the force scale factor n with the ratio $M_{pi}/M_{pz}$.

The output signal of the adder 35 dictates the orientation of stator magnetic fields of the synchronous motors 1 and 2. If this signal is an angle code or is converted into a code from an analog signal, the unit 22 whose structure is shown in FIGS. 3A and 3B is used. This signal is applied to the address inputs of the permanent memory 42 where codes of supply pulse duration and polarity are available for all three windings of the synchronous motors 1 and 2. These codes can be used to ensure orientation of magnetic fields of the stators of the synchronous motors 1 and 2 in accordance with the angle assigned by the code fed to the address inputs of the permanent memory 42. Pulse duration codes are taken from the permanent memory 42 to the subtract counters 45 by applying these codes to the inputs 43 of the converters 44 (only one counter is shown in the drawing for simplicity). The frequency of supply of these codes is permanent. Codes are entered as pulses are fed from the output of the frequency divider 67, which divides the frequency of the generator 66, to the input 68 of the converters 44. After codes are recorded, logical "1" is produced at the inverting borrow outputs of the counters 45 to initiate the supply pulses for the motor windings. Logical "1" is also produced at the inputs 48 of the logical AND elements 46 enabling pulses to pass from the borrow output of the down counter 63 to the subtract inputs 47 of the counters 45. The frequency of these pulses is inversely proportional to the modulus code of the control signal supplied from the circuit 61 for determination of the modulus (absolute value) to the setting input 62 of the subtracting counter 63. The repetition period of pulses is equal to the pulse spacing of the generator 66 multiplied by the modulus code of the control signal. This means that this code is proportional to the duration of pulses at the borrow outputs of the subtracting counters 45. Pulses are no longer produced at these borrow outputs when digits in the counters 45 are all zero. At this instant a logical zero signal is produced at the borrow outputs of the counters 45, and this logical zero signal blocks the arrival of pulses from the borrow output of the subtracting counter 63 to the subtracting inputs 47 of the counters 45 via the logical AND elements 46. The control signal applied to the inputs 59 of the switching devices 50 from the output of the polarity determination circuit 60 enables pulses to be supplied from the outputs of the converters 44 via the logical AND elements 51 or logical AND elements 52. The windings are connected, depending on the signals applied to the polarity setting inputs 58, to one or the other pole of the voltage source 57 by means of switches 55 or 56. The exclusive OR element 53 inverts the polarity of the winding supply pulses in accordance with the output signals of the circuit 60.

A control signal is produced at the output of the correction unit 24 which may be structured in different ways. This correction unit 24 processes the mismatch signal taken from the output of the comparison unit 18, the signal of the position sensor 9 or 10 being applied to the subtracting input of said unit 18, depending on the position of the switching device 27. It should be pointed out that signals are applied to the inputs of the adder 35 and the comparison unit 18 from different outputs of the switching device 27.

In accordance with the polarity of the mismatch signal produced by the circuit 38, the unit 17 for determination of the assigned mismatch uses the adder 39 to add the signal corresponding to the angle $+(90°-\alpha)$ or $-(90°-\alpha)$ to the signal of one of the position sensors 9 or 10, which is supplied to the information input 14 of the device 16 for assigning the amplitude of magnetic fields. The signal corresponding to the angle $\alpha$ calculated by the converter 36 in accordance with equation (6) or (7) depending on the quantity n, is multiplied in the multiplier 37 by the signal corresponding to "+1" or "−1" depending on the polarity of the mismatch signal and is supplied to one of the inputs of the adder 39. In this way magnetic fields of the stators of the synchronous motors 1 and 2 are controlled as shown by the vector diagrams in FIG. 5a, b, c, d, e, f.

To realize the systems for remote transmission of the angular position and force, whose magnetic field vector diagrams are shown in FIGS. 6 and 7, the stator windings of the synchronous motors 1 and 2 should be in aiding connection. In this case the adder 69 (FIG. 4) is inserted into the unit 17 for determination of the assigned mismatch. This adder 69 adds a 90° angle to the angle $\alpha$ mentioned above between the magnetic fields of the rotor and stator of one of the synchronous motors 1 or 2 in order to ensure that in the balanced state the angle between $\overline{\Phi}_{rz}$ and $\overline{\Phi}_{ri}$ is equal to $(90°+\alpha)$ and not to $(90°-\alpha)$ as in the embodiment shown in FIGS. 3A and 3B. Since the output signal of the force scale factor converter 36 is applied to the setting input of the multiplier 34, the magnetic fields are oriented as shown in FIG. 7a, b, c, d, e, f. To realize the vector diagrams shown in FIG. 6a, b, c, d, e, f, a signal corresponding to the 90° angle is applied to the setting input of the multiplier 34 as described in FIG. 3. This alternative embodiment is not shown in FIG. 4.

The embodiment of FIG. 4 is peculiar in that the circuit 70 for determination of polarity of the mismatch signal is shared by the unit 13 for assigning the orientation of magnetic fields and by the unit 17.

Let us assume that initially the output signal of the integrator 71 is zero, as is the output signal of the comparison unit 18. At this stage, a zero signal is supplied to the control input of the unit 22 for producing current in the windings. When some signal is produced at the output of the comparison unit 18, the comparison circuit 74 generates a signal whose absolute value code is supplied via the circuit 61 (FIGS. 3A and 3B) to the subtract counter 63. With the structure of the unit 22 shown in FIG. 3, the polarity of this signal is disregarded. Simultaneously, the output signal of the integrator 71 (FIG. 4) grows and, if the polarity of the output signal of the comparison unit 18 is reversed, it starts diminishing. After the transient process is over, the output of the comparison unit 18 becomes equal to zero, while the amplitudes of the magnetic fields of stators of the synchronous motors 1 and 2 remain under control of the absolute value of the output signal of the integrator 71. In case the angle between the magnetic fields of the rotor and stator of the synchronous motor 2, shown in FIG. 5a, starts increasing due to the growth of the moment $M_i$, the output signal of the multiplier 73 acquires the same polarity as the mismatch signal of the master and slave shafts 5 and 6, that is the output signal of the comparison circuit 74 grows and so does the moment $M_2$. The shafts of the synchronous motors 1 and 2 return to the position where the output signal of the comparison unit 18 is zero. In case the moment $M_i$ decreases, the polarity of the output signal of the multiplier 73 remains unchanged, while the polarity of the output signal of the comparison unit 18 is reversed. In consequence, the output signal of the correction unit 24 decreases, brings down the moments $M_1$ and $M_2$, and the balance is restored. An indication of this is the zero output of the comparison unit 18.

The herein proposed system for remote transmission of the angular position and force between master and slave shafts can be effectively used in master-slave manipulators.

I claim:

1. A system for remote transmission of the angular position and force between master and slave shafts, comprising master and slave synchronous machines (1,2) whose shafts (3,4) are connected, respectively, to master and slave shafts (5,6) and provided with position sensors (9,10) electrically connected to inputs (11,12) of a field orientation assignment unit (13) for assigning orientation of stator magnetic fields of the master and slave synchronous machines and to information inputs (15,14) of a device (16) for assigning the amplitude of stator magnetic fields of the master and slave synchronous machines, having the output thereof electrically connected to a control input (21) of a current producing unit (22) producing current in the windings of the master and slave synchronous machines, whose setting input (23) is connected to the output of the field orientation assignment unit (13) for assigning orientation of stator magnetic fields of the master and slave synchronous machines and whose outputs are connected to electrically linked respective windings of the master and slave synchronous machines (1,2), characterized in that device (16) for assigning the amplitude of stator magnetic fields of the master and slave synchronous machines comprises a mismatch determination unit (17) for determination of the assigned mismatch between the shafts of the master and slave synchronous machines, having a setting input (20) which receives a signal corresponding to a scale factor (n) of the force transmitted to the shaft (3) of the master synchronous machine (1) and information inputs which are the information inputs (14,15) of the device (16) for assigning the amplitude of stator magnetic fields of the master and slave synchronous machines, and a comparison unit (18) whose information inputs are connected to information inputs of the mismatch determination unit (17) for determination of the assigned mismatch of the shafts of the master and slave synchronous machines, while a setting input (19) thereof is connected to the output of the mismatch determination unit (17) for determination of the assigned mismatch of the shafts of the master and slave synchronous machines, and the output of which is the output of the device (16) for assigning the amplitude of stator magnetic fields of the master and slave synchronous machines.

2. A remote transmission system as claimed in claim 1, characterized in that it comprises a correction unit (24) having its input connected to the output of the device (16) for assigning the amplitude of stator magnetic fields of the master and slave synchronous machines, while its output is connected to the control input (12) of the current producing unit (22) for producing current in the windings of the master and slave synchronous machines.

3. A remote transmission system as claimed in claims 1 or 2, characterized in that it comprises a switching device (27) whose information inputs (25, 26) are connected to position sensors (9,10) of the shafts of the master and slave synchronous machines and a circuit (29) for determination of polarity of the mismatch signal, having one input connected to the setting input (20) of the mismatch determination unit (17) for determination of the assigned mismatch between the shafts of the master and slave synchronous machines, having the other input (30) receive a signal corresponding to the ratio ($M_{pi}/M_{pz}$) of the starting moments of the slave and master synchronous machines (2,1), and having the output thereof connected to a control input (28) of the switching device (27) whose outputs are connected to the inputs (11,12) of the field orientation assignment unit (13) for assigning orientation of stator magnetic fields of the master and slave synchronous machines and to information inputs (15,14) of the device (16) for assigning the amplitude of stator magnetic fields of the master and slave synchronous machines.

4. A remote transmission system as claimed in claim 1 or 2, characterized in that the field orientation assignment unit (13) for assigning orientation of stator magnetic fields of the master and slave synchronous machines comprises, connected in series, a circuit (31) for determination of the polarity of the mismatch signal of the shafts of the master and slave synchronous machines, whose inputs are the inputs of the field orientation assignment unit (13) for assigning orientation of stator magnetic fields of the master and slave synchronous machines, and a multiplier (34) having a setting input receiving a signal corresponding to the angle between magnetic fields of the rotor and stator of the master and slave synchronous machines (1,2), and an adder (35) having one input connected to the output of the multiplier (34), the other input connected to one input of the circuit (31) for determination of the polarity of the mismatch signal of the shafts of the master and slave synchronous machines, and the output thereof functioning as the output of the field orientation assignment unit (13) for assigning orientation of the stator magnetic fields of the master and slave synchronous machines.

5. A remote transmission system as claimed in claim 2, characterized in that the mismatch determination unit (17) for determination of the assigned mismatch between the shafts of the master and slave synchronous machines comprises a converter (36) of the force scale factor into the angle between the magnetic fields of the rotor and stator of the master or slave synchronous machine, a multiplier (37) having its first input electrically connected to an output of the converter (36) of the force scale factor into the angle between the magnetic fields of the rotor and stator of the master and slave synchronous machines, a circuit (38) for determination of the polarity of the mismatch signal of the shafts of the master and slave synchronous machines, whose output is connected to a second input of the multiplier (37), and an adder (39) having one input thereof connected to the output of the multiplier (37), having the other input connected to one of the inputs of the circuit (38) for determination of the polarity of the mismatch signal between the shafts of the master and slave synchronous machines, which are information inputs of the mismatch determination unit (17) for determination of the assigned mismatch of the shafts of the master and slave synchronous machines, and having the output thereof as the output of the mismatch determination unit (17) for determination of the assigned mismatch of the shafts of the master and slave synchronous machines.

6. A remote transmission system as claimed in claim 3, characterized in that the mismatch determination unit (17) for determination of the assigned mismatch of the shafts of the master and slave synchronous machines comprises a converter (36) of the force scale factor into the angle between the magnetic fields of the rotor and stator of the master or slave synchronous machine, a multiplier (37) having a first input electrically connected to an output of the converter (36) of the force scale factor into the angle between the magnetic fields of the rotor and stator of the master or slave synchronous machine, a circuit (38) for determination of the polarity of the mismatch signal of the shafts of the master and slave synchronous machines, having the output thereof connected to a second input of the multiplier (37), and an adder (39) having one input connected to the output of the multiplier (37), the other input connected to one of the inputs of the circuit (38) for determination of the polarity of the mismatch signal of the shafts of the master and slave synchronous machines, which are information inputs of the mismatch determination unit (17) for determination of the assigned mismatch of the shafts of the master and slave synchronous machines, while the output thereof is the output of the mismatch determination unit (17) for determination of the assigned mismatch of the shafts of the master and slave synchronous machines.

7. A remote transmission system as claimed in claim 4, characterized in that the mismatch determination unit (17) for determination of the assigned mismatch of the shafts of the master and slave synchronous machines comprises a converter (36) of the force scale factor into the angle between the magnetic fields of the rotor and stator of the master or slave synchronous machine, a multiplier (37) having its first input electrically connected to an output of the converter (36) of the force scale factor into the angle between the magnetic fields of the rotor and stator of the master or slave synchronous machine, a circuit (38) for determination of the polarity of the mismatch signals of the shafts of the master and slave synchronous machines, having its output connected to a second input of the multiplier (37), and an adder (39) having its one input connected to the output of the multiplier (37), the other input connected to one of the inputs of the circuit (38) for determination of the polarity of the mismatch signal of the shafts of the master and slave synchronous machines, which are information inputs of the mismatch determination unit (17) for determination of the assigned mismatch of the shafts of the master and slave synchronous machines, while the output thereof is the output of the mismatch determination unit (17) for determination of the assigned mismatch of the shafts of the master and slave synchronous machines.

8. A remote transmission system as claimed in claim 2, characterized in that the correction unit (24) comprises an integrator (71), a circuit (72) for determination of the absolute value of the signal, having its input connected to an output of the integrator (71), a multiplier (73) having a first input connected to the output of the circuit (72) for determination of the signal absolute value, while a second input thereof receives a signal corresponding to the polarity of the mismatch signal of the shafts (3,4) of the master and slave synchronous machines (1,2), and a comparison circuit (74) having its first input connected to the output of the multiplier (73), its second input connected to the input of the integrator (71), their connection point being the input of the correction unit (24), and the output of the comparison circuit (74) is the output of the correction unit (24).

9. A remote transmission system as claimed in claim 4, characterized in that the correction unit (24) comprises an integrator (71), a circuit (72) for determination of the signal absolute value, having its input connected to an output of the integrator (71), a multiplier (73) having its first input connected to the output of the circuit (72) for determination of the signal absolute value, while its second input receives a signal corresponding to the polarity of the mismatch signal of the shafts (3,4) of the master and slave synchronous machines (1,2), and a comparison circuit (74) having its first input connected to the output of the multiplier (73), its second input connected to the input of the integrator (71), their connection point being the input of the correction unit (24), and the output of the comparison circuit (74) is the output of the correction unit (24).

10. A remote transmission system as claimed in claim 9, characterized in that the second input of the multiplier (73) of the correction unit (24) is connected to the output of the circuit (34) for determination of the polarity of the mismatch signal of the shafts of the master and slave synchronous machines of the field orientation assignment unit (13) for assigning the orientation of magnetic fields of the stators of the master and slave synchronous machines.

11. A remote transmission system as claimed in claim 5, characterized in that the correction unit (24) comprises an integrator (71), a circuit (72) for determination of the signal absolute value, having its input connected to an output of the integrator (71), a multiplier (73) having its first input connected to the output of the circuit (72) for determination of the signal absolute value, while its second input receives a signal corresponding to the polarity of the mismatch signal of the shafts (3,4) of the master and slave synchronous machines (1,2), and a comparison circuit (74) having its first input connected to the output of the multiplier (73), its second input connected to the input of the integrator (71), their connection point being the input of the correction unit (24), and the output of the comparison circuit (74) is the output of the correction unit (24).

12. A remote transmission system as claimed in claim 11, characterized in that the second input of the multiplier (73) of the correction unit (24) is connected to the output of the circuit (38) for determination of the polarity of the mismatch signal of the shafts of the master and slave synchronous machines of the mismatch determination unit (17) for determination of the assigned mismatch of the shafts of the master and slave synchronous machines.

13. A remote transmission system as claimed in claim 5, characterized in that the mismatch determination unit (17) for determination of the assigned mismatch of the shafts of the master and slave synchronous machines additionally comprises an adder (69) having one input connected to an output of the converter (36) of the force scale factor into the angle between the magnetic fields of the rotor and stator of the master or slave synchronous machine, while the other input receives a signal corresponding to the angle 90° of the magnetic field of the stator of the master or slave synchronous machine (1,2), while the output thereof is connected to the first input of the multiplier (37).

14. A remote transmission system as claimed in claim 6, characterized in that the mismatch determination unit (17) for determination of the assigned mismatch of the shafts of the master and slave synchronous machines additionally comprises an adder (69) having one input connected to an output of the converter (36) of the force scale factor into the angle between the magnetic fields of the rotor and stator of the master or slave synchronous machine, while the other input receives a signal corresponding to the angle 90° of the magnetic field of the stator of the master or slave synchronous machine (1,2), while the output thereof is connected to the first input of the multiplier (37).

15. A remote transmission system as claimed in claim 7, characterized in that the unit (17) for determination of the assigned mismatch of the shafts of the master and slave synchronous machines additionally comprises an adder (69) having one input connected to an output of the converter (36) of the force scale factor into the angle between the magnetic fields of the rotor and stator of the master or slave synchronous machine, while the other input receives a signal corresponding to the angle 90° of the magnetic field of the stator of the master or slave synchronous machine (1,2), while the output thereof is connected to the first input of the multiplier (37).

* * * * *